Figure 1:
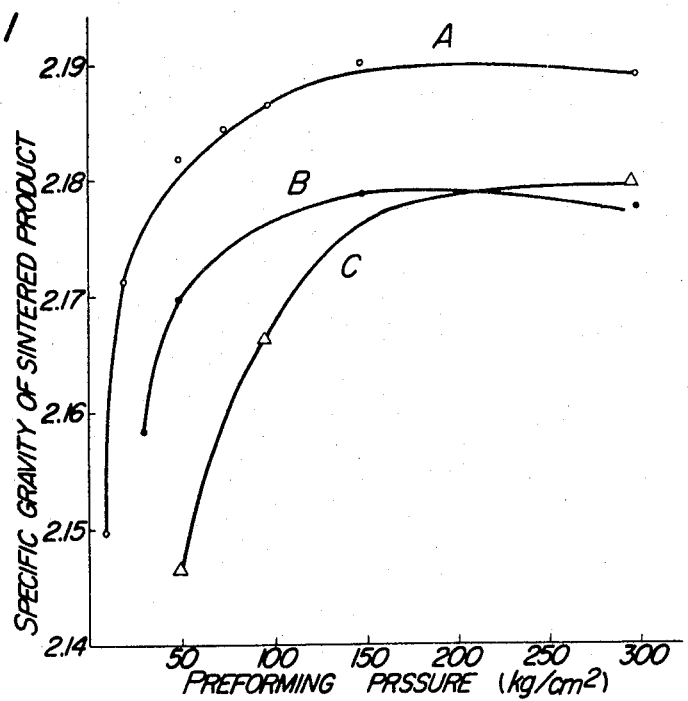

United States Patent [19]
Kometani et al.

[11] 3,726,483
[45] Apr. 10, 1973

[54] PROCESS THE PREPARATION OF ULTRA-FINE POLYTETRAFLUOROETHYLENE MOLDING POWDER

[75] Inventors: Yutaka Kometani, Nishinomiya, Syozo Fumoto, Suita, Singo Tanigawa, Osaka, all of Japan

[73] Assignee: Daikin Kogyo Co., Ltd., Osaka, Japan

[22] Filed: Dec. 30, 1970

[21] Appl. No.: 102,841

[52] U.S. Cl. ............................... 241/5, 260/92.1
[51] Int. Cl. .................................... B02c 19/06
[58] Field of Search .................. 241/5, 23, 39; 260/92.1

[56] References Cited

UNITED STATES PATENTS

| | | | |
|---|---|---|---|
| 3,602,439 | 8/1971 | Nakayama | 241/39 |
| 3,115,486 | 12/1963 | Weisenberger | 241/23 X |
| 3,152,201 | 10/1964 | Kummick | 241/23 X |
| 3,614,000 | 10/1971 | Blythe | 241/5 |

FOREIGN PATENTS OR APPLICATIONS

| | | | |
|---|---|---|---|
| 1,017,749 | 1/1966 | Great Britain | 241/5 |
| 1,076,852 | 7/1967 | Great Britain | 241/5 |

*Primary Examiner*—Granville Y. Custer, Jr.
*Attorney*—Cushman, Darby & Cushman

[57] ABSTRACT

A process for the preparation of ultra-fine polytetrafluoroethylene molding powder having a specific surface area of 4 to 9 $m^2/g$ as measured by nitrogen adsorption, a low pressure molding coefficient of not greater than 20 and a surface smoothness of higher than 15 seconds, which comprises pulverizing a polytetrafluoroethylene molding powder obtained by a suspension polymerization method and having a specific surface area of 2 to 4 $m^2/g$ as measured by nitrogen adsorption mainly by the milling action effected by interparticle collision at a temperature below 100° C. The ultra-fine molding powder obtained according to this process can be molded by a conventional compression molding method used for a polytetrafluoroethylene molding powder, applying a low preforming pressure of 50 to 150 $Kg/cm^2$, followed by sintering.

3 Claims, 3 Drawing Figures

PROCESS THE PREPARATION OF ULTRA-FINE POLYTETRAFLUOROETHYLENE MOLDING POWDER

The present invention relates to a process for the preparation of ultra-fine polytetrafluoroethylene (PTFE) molding powder. More particularly, the present invention relates to a process for the preparation of an ultra-fine PTFE molding powder having a specific surface area of 4 to 9 m$^2$/g as measured by nitrogen adsorption, a low pressure molding coefficient of not greater than 20 and a surface smoothness of higher than 15 seconds.

There are known two distinct grades of PTFE powder suitable for the preparation of molded articles generally called "molding powder" and "fine powder." "Molding powder" is a granular powder obtained by contacting tetrafluoroethylene (TFE) with an aqueous medium containing a polymerization initiator under pressure as described in, for example, U.S. Pat. No. 2,939,967, and "fine powder" is a coagulated powder obtained by congulating an aqueous colloidal dispersion of PTFE obtained by contacting TFE with an aqueous medium containing a polymerization initiator in the presence of an emulsifying agent as described in, for example, U.S. Pat. Nos. 2,559,750 and 2,750,350.

PTFE molding powder has a specific surface area of 1 to 4 m$^2$/g, which corresponds to a theoretical average particle diameter of the order of 2.73 to 0.68 microns assuming that all particles are spherical, and fine powder has a specific surface area of 9 to 14 m$^2$/g which corresponds to 0.30 to 0.19 micron.

As is well-known, since PTFE exhibits almost no fluidity even when heated to a temperature above the melting point of 327° C, a molding method employed for the common thermoplastic resins is not applicable to said PTFE powder, and it is molded by a method similar to powder metallurgy. That is to say, the powder is preformed under a high pressure of 150 to 350 Kg/cm$^2$, and then sintered at a temperature above 327° C (compression molding).

It has naturally been inferred that the softer the powder and the smaller the particle size, the denser the product obtained, and an attempt has been made to carry out the compression molding by employing a "-fine powder." However, a "fine powder" tends to stick to a mold in preforming, and forms cracks during sintering. Moreover, it cannot withstand for such a long sintering period as "molding powder." Therefore, except in special cases, for instance to form a thin product, a special molded product, a "fine powder" has not been used for compression molding.

"Molding powder" is used for molding a thick product by compression molding.

In order to obtain a dense molded product, coarse particles of PTFE polymer should be suitably pulverized. However, PTFE powder has a tendency to become fibrous when a shear force is applied during pulverization as described in, for instance, U.S. Pat. No. 2,936,301, and such fibrous fine powder may provide a preform with an increased mechanical strength and yield a dense molded product even under a low preforming pressure, but it has many problems such as agglomeration during transportation and storage, a poor powder flow property and production of rough surfaces of a molded article.

Extensive research has been done on a process for the preparation of non-fibrous, fine PTFE powder having an improved powder flow property and being capable of yielding a dense molded article. British Pat. No. 1,017,749 discloses a process for the preparation of porous, non-fibrous, fine PTFE powder having a particle size not greater than 50 microns, wet-sieve size, a distribution function not greater than 0.40, a sub-sieve size not greater than 5.0 microns and a ratio of wet-sieve size to sub-sieve size in the range of 2 to 20, which comprises subjecting PTFE particles to milling effected substantially solely by inter-particle collision in a high-velocity gas stream. British Pat. No. 1,076,852 discloses a process for the preparation of non-fibrous, fine PTFE powder having a wet sieve size of less than 40 microns, a shape factor of less than 15, an anisotropic expansion factor in the range of 1.02 to 1.26 and a surface smoothness of more than 15 seconds, which comprises pulverizing a relatively soft PTFE powder obtained by the polymerization of TFE at a low temperature, such as from 0° to 40° C in the absence of liquid monomer, with a hammer type pulverizer mainly by collision force.

Fine PTFE powders obtained by a conventional pulverizing method are all those having a specific surface area of less than 4 m$^2$/g, and no pulverizing method has been developed by which PTFE powders having a specific surface area of more than 4 m$^2$/g are obtainable. Further, it has not been known that such a finely divided PTFE powder can be molded under low preforming pressure and sintered without the occurrence of cracks.

The ultra-fine PTFE powder obtained in accordance with the aforesaid known method still requires a high preforming pressure of 150 to 350 Kg/cm$^2$, and no fine PTFE powders capable of producing a dense molded article having a high surface smoothness even under a lower preforming pressure have been produced. High preforming pressure will require a thick mold withstanding such a pressure, which renders handling of the mold difficult and is disadvantageous in the respect of mold cost, and in requiring a huge press for molding a large sheet. If a fine PTFE powder which can be preformed at a low pressure to produce a dense molded product is obtained, it will not only reduce the cost of a mold and press, but also provide a continuous roll-molding method which has been applied to a "fine powder."

An object of the present invention is to provide a process for the preparation of ultra-fine PTFE powder.

Another object of the present invention is to provide an ultra-fine PTFE powder excellent in powder flow property and capable of producing a dense molded article even under a low preforming pressure.

A further object of the present invention is to provide a process for the preparation of ultra-fine PTFE powder having a specific surface area of from 4 to 9 m$^2$/g, a low pressure molding coefficient lower than 20 and a surface smoothness of higher than 15 seconds.

Other objects and advantages of the present invention will become apparent to those skilled in the art from the following description.

According to the present invention, there is provided a process for the preparation of an ultra-fine PTFE powder having a specific surface area of from 4 to 9

$m^2/g$ as measured by nitrogen adsorption, a low pressure molding coefficient of lower than 20 and a surface smoothness of higher than 15 seconds, which comprises pulverizing a PTFE molding powder having a specific surface area of from 2 to 4 $m^2/g$ by milling action effected mainly by interparticle collision.

The ultra-fine PTFE powder obtained in accordance with the present invention will solve the above-mentioned problems in the compression molding of PTFE, and yields a sufficiently dense molded article even under low preforming pressures which never been considered before.

As a starting material employed in the present invention, a PTFE molding powder having a specific surface area of from 2 to 4 $m^2/g$ and a low pressure molding coefficient of from 20 to 150 may suitably be employed, including a non-fibrous PTFE granular powder having a wet sieve size of less than 40 microns as described in British Pat. No. 1,076,852, and a spheroidal granulated PTFE powder having an average particle size of not greater than 5,000 microns, a specific surface area of greater than 2 $m^2/g$, an anisotropic expansion factor of not more than 1.16 and a surface smoothness higher than 15 seconds as described in British Pat. No. 1,135,921. Furthermore, the powder flow property of the PTFE powder containing a major proportion of fibrous particles, and having an air-permeability sub-sieve size of from 2.8 to 4 microns and a wet sieve size of from 20 to 40 microns as described in U.S. Pat. No. 2,936,301 will be improved by the present process and the surface smoothness of a molded article will also be improved. It is not preferable in accordance with the present invention to employ a PTFE powder having a specific surface area of not greater than 2 $m^2/g$ and a low pressure molding coefficient of greater than 150, and it is desirable to pulverize such a PTFE powder by any method to a powder having a specific surface area of greater than 2 $m^2/g$ before applying the process of the present invention.

Figure 2:
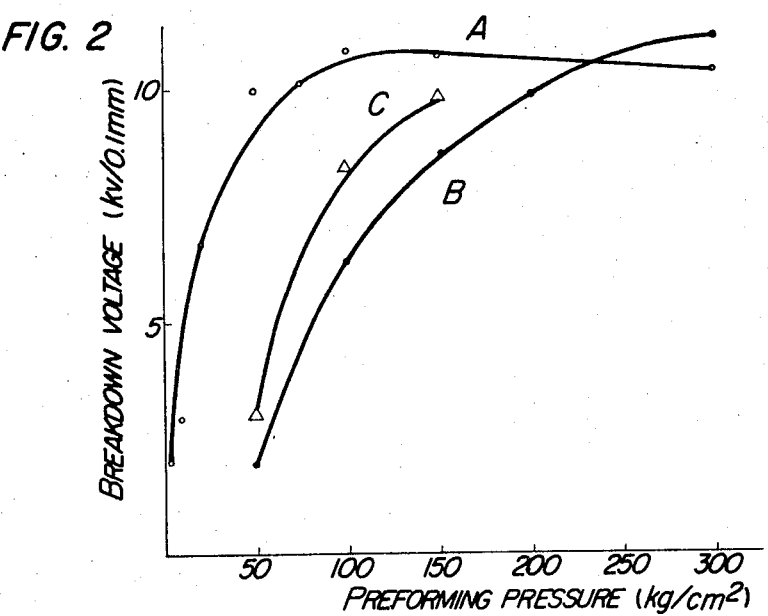

The process of the present invention is further explained specifically with reference to the attached drawings, wherein FIG. 1 is a graph showing a relation between a preforming pressure and a specific gravity of a sintered product; FIG. 2 is a graph showing a relation between a preforming pressure and a breakdown voltage; and FIG. 3 is a cross-sectional view of a preferred air mill employed in the present invention.

According to the process of the present invention, pulverization is carried out at a temperature lower than 100° C., more preferably below 50° C by means of an air mill having a hollow circular chamber in which a powder is forced to cycle by an ultrasonic gas stream.

As the air mill, a commercially available ultrasonic Jet Mizer (manufactured by Nippon Pneumatic Industry Co., Ltd.) is particularly suitable. As an air mill which pulverizes a powder mainly by inter-particle collision, a Jet-O-Mizer (manufactured by Fluid Energy Processing Equipment Co.) is known, as described in British Pat. No. 1,017,749. This air mill has the shape of a hollow elongated toroid and a powder is jetted into a milling chamber at a rate of nozzle stream of 900 to 1,300 feet/sec. (270 to 390 m/sec.) and a PTFE powder with an average particle size of about 100 to 1,000 microns is pulverized to that of 15 to 30 microns. In contrast, the ultrasonic Jet Mizer used in the present invention has a hollow circular milling chamber as shown in FIG. 3, into which an ultrasonic gas stream is fed simultaneously from a nozzle at a rate of more than 2.5 Mach and the circumference of the circle, and sieved coarse particles are recycled along with the gas stream from the circumference of the circle. Collision, therefore, occurs violently between the starting coarse particles fed by the gas stream from a nozzle and the particles recycled from the circumference region of the circle, and this is associated with the ultrasonic gas stream to permit a more effective milling.

Figure 3:
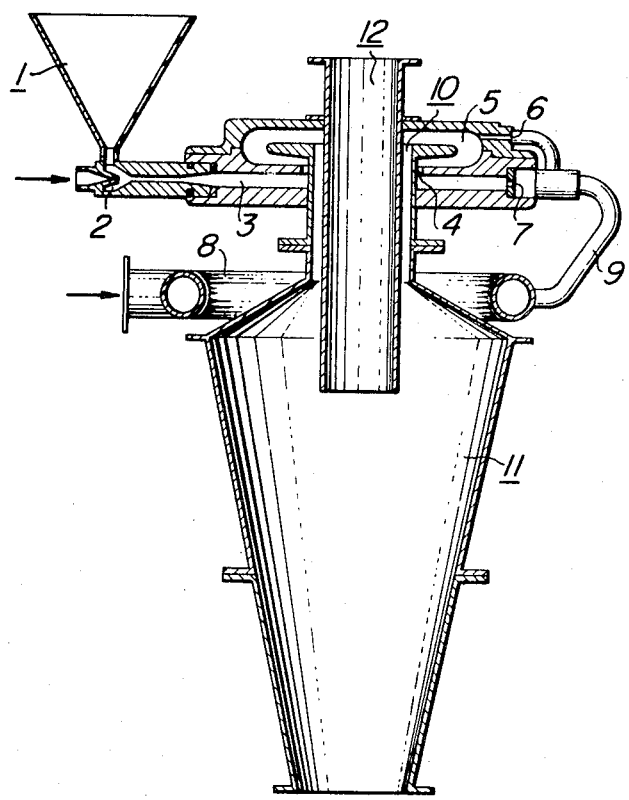

In FIG. 3, a starting powder fed through the hopper 1 is sent to the milling chamber 3 by means of a gas stream jetted from the nozzle 2 and circulated and milled therein. Subsequently, it is sent to the milling chamber 5 through the passages 4. In the circumference of the milling chamber 5 there are provided many outlets 6, from which coarse particles are recycled through the inlet 7 into the milling chamber 3 by means of a gas stream fed by the conduit 9 and remilled.

In the milling chamber 3, a circulating gas stream from the nozzle 2 and the recycled stream from the inlet 7 are mixed to form a turbulent flow, thereby promoting the interparticle collision.

Finely milled powder is collected in the cyclone 11 through the passage 10 and discharged from the bottom of the cyclone. The air containing a small quantity of the milled powder is discharged through the passage 12 into a bag filter.

The ultra-fine PTFE powder obtained in accordance with the present invention has a specific surface area of from 4 to 9 $m^2/g$ as measured by nitrogen adsorption, but the wet sieve size of the powder is not measured because all of the powder pass through 400 mesh U.S. Standard sieve (opening is 37 microns). The ultra-fine powder obtained by the process of the present invention consists mainly of particles with a particle size of from 2 to 3 microns, whereas the powder obtained by the process described in British Pat. No. 1,076,852 remains in a size of 30 to 40 microns.

The molding method and the testing method employed in the present invention are according to ASTM, except that the preforming pressure and sintering conditions are varied. Sintering is carried out at 370° C for 5.5 hours and the temperature is lowered to 100° C at a rate of 50° C per hour and the sample is then cooled free.

The ultra-fine powder of the present invention provides a sufficiently dense molded article even under a preforming pressure as low as 50 $Kg/cm^2$, while the preforming pressure applied to a conventional PTFE molding powder is from 150 to 350 $Kg/cm^2$. This will clearly be proven by comparing the physical properties of a product obtained by molding the present ultra-fine powder under a low pressure with those of a product obtained by molding a conventional powder under the same conditions.

The physical properties of products obtained by molding the present ultra-fine PTFE powder under various preforming pressures are compared with those of the products obtained by molding the fine PTFE molding powder containing a major proportion of fibrous particles described in U.S. Pat. No. 2,936,301 (fibrous fine powder) and the non-fibrous fine PTFE molding powder described in British Pat. No. 1,076,852 (non-fibrous fine powder).

Microphotographs of the microtomes of products obtained by molding under a preforming pressure of 50 Kg/cm² the present ultra-fine powder and the non-fibrous fine powder, respectively, show substantially no voids in the photograph of product of the invention, while many voids (black parts in the photograph) are observed in the photograph of the product of the British patent.

FIGS. 1 and 2 are graphs showing the relations between the preforming pressure and the specific gravity and the breakdown voltage, respectively, of products obtained by molding the present ultra-fine powder A, the fibrous fine powder B and non-fibrous fine powder C under various preforming pressures. When preformed under a pressure of 30 Kg/cm², the ultra-fine powder obtained by the present process produces a molded product having a specific gravity and a breakdown voltage corresponding to those of a molded product obtained by premolding a conventional fine powder under a pressure of 200 Kg/cm².

For the purposes of the present invention, the terms used above are defined as follows:

The term "low-pressure molding coefficient" means the value obtained by multiplying the difference between the true specific gravities of the molded articles formed under pre-molding pressures of 150 Kg/cm² and 50 Kg/cm² by 1000, and indicates the low pressure moldability of the fine powder obtained in accordance with the present invention. The low pressure molding coefficient of the present ultra-fine powder is higher than 15, whereas that of any known fine PTFE molding powder is lower than 20.

The "surface smoothness" is measured by the number of seconds required for 10 c.c. of air to permeate through the space between a sheet, prepared by the steps of preforming the powder into a sheet of 100 mm diameter and 1.5 mm thickness under a pressure of 300 Kg/cm², sintering the same without pressure and a table made of an optical glass having a ground surface and an effective area of $10 \pm 0.05$ cm² at a pressure differential of 3.80 mm Hg. It is preferably measured at 23° C, repeated three times for each surface of the sample plate and the value of surface smoothness determined by the average of the measurements. It is measured on the Bekk Smoothness Tester as prescribed in JIS (Japanese Industrial Standard) P. 8119 – 1963 (testing method for smoothness of paper and paper board by Bekk Tester).

The ultra-fine PTFE powder of the present invention always gives molded articles having a surface smoothness of higher than 15, and in contrast, a molded article obtained from the "fibrous fine powder" has a surface smoothness of lower than 2 seconds.

All the methods employed for compression-molding of conventional PTFE molding powder are applicable to the present ultra-fine PTFE powder. However, the preforming pressure for the conventional molding powder of PTFE is from 150 to 350 Kg/cm², and on the other hand, the preforming pressure for the present ultra-fine powder ranges from 30 to 300 Kg/cm², preferably from 50 to 150 Kg/cm².

The powder obtained in accordance with the present process may be employed alone for the compression molding, and also can be satisfactorily employed in combination with any of the inorganic fillers blended with the conventional PTFE powder for the enhancement of the abrasion-resistance. Further, the powder obtained by the present process can be used as a dry lubricant or as a compounding agent with other plastics. The present ultra-fine PTFE powder may also be used for the preparation of a PTFE organo sol which is produced from an aqueous PTFE dispersion.

The present invention is further explained by the following examples, which are only by way of illustration and not by way of limitation, and in which parts are by weight unless otherwise specified.

Polymerization Example 1

Into a stainless steel autoclave (which can contain 2 million parts of water) equipped with an agitator was charged one million parts of deoxygenated and demineralized water, and the air therein was replaced by nitrogen which was then replaced by TFE. The temperature of the autoclave was maintained at 3° C and TFE was introduced until the pressure rose up to 8 atms. As a polymerization initiator there were added 100 parts of water containing 2 parts of ammonium persulfate, 5 parts of sodium bisulfite and 1 part of ferrous sulfate, and agitation was started.

When the polymerization proceeded, and the pressure was reduced to 7 atms., TFE was again introduced under pressure to a pressure of 8 atms. This operation was repeated 25 times, and the agitation was stopped after about 6 hours and unreacted TFE was recovered. The contents were discharged, washed with water and dried. There were obtained about 300,000 parts of PTFE polymer having an irregular form.

Polymerization Example 2

Into a stainless steel (autoclave which can contain 2 million parts of water), with a spherical bottom and equipped with an anchor type stirrer were charged 1 million parts of deoxygenated and demineralized water and 300,000 parts of trichlorotrifluoroethane. The air therein was replaced by nitrogen which was then replaced by TFE. The temperature was kept at 3° C and TFE was introduced to a pressure of 6 atms. As a polymerization initiator there were added 100 parts of water containing 10 parts of ammonium persulfate, 5 parts of sodium bisulfite and 5 parts of ferrous sulfate, and agitation was started. TFE was continuously added under pressure so that the pressure was maintained at 6 atms., agitation was stopped after about 2 hours and unreacted TFE was recovered. The contents were washed with water and dried. There were obtained about 300,000 parts of uniform spherical PTFE polymer particles having an average particle size of 1,000 microns, and a specific surface area of 2.5. (This particle corresponds to the PTFE particle described in British Pat. No. 1,135,921.)

Polymerization Example 3

Into a stainless steel autoclave (which can contain 4.5 million parts of water) equipped with a stirrer were charged 3 million parts of deoxygenated and demineralized water, and the air therein was replaced by nitrogen which was then replaced by TFE. TFE was then introduced at 60° C to a pressure of 6 atms. As a polymerization initiator there was added 100 parts of water containing one part of ammonium persulfate and agitation was started. TFE was continuously added under pressure so that the pressure was maintained at 6 atms. Agitation was stopped after about 5 hours and unreacted TFE was recovered. The contents were washed with water and dried. There were obtained about 450,000 parts of granular PTFE polymer.

Polymerization Example 4

Into a stainless steel autoclave (which can contain 2.7 million parts of water) equipped with a stirrer were charged 1.2 million parts of deoxygenated and demineralized water and the air therein was replaced by nitrogen which was then replaced by TFE. 250,000 parts of TFE was introduced under pressure while maintaining the temperature at 3° C. As a polymerization initiator these were added 100 parts of water containing 1 part of ammonium persulfate, 2 parts of sodium bisulfite and 5 parts of ferrous sulfate, and agitation was started. Polymerization was effected under a pressure of about 18 atms under the conditions that liquid TFE was present. Agitation was stopped after about 6 hours and unreacted TFE was recovered. The contents were discharged, washed with water and dried. These was obtained about 150,000 parts of TFE polymer having an irregular form.

Comparative Example 1

The polymer obtained in Polymerization Example 1 was milled by means of an "Ultramizer" a hammer mill (manufactured by Fuji Kogyo Co., Ltd.). The "Ultramizer" has a rotary disk provided with 16 hammers along the periphery thereof, in which particles are pulverized chiefly by collision force resulting from the rotation of said disk. The disk of the Ultramizer was rotated at a peripheral speed of 98 m/sec. at about 25° C. The fine PTFE powder obtained was a non-fibrous fine powder having a wet-sieve size of 35 microns, a specific surface area of 3.6 $m^2$/g and a low pressure molding coefficient of 26.6, and was suitable as a common molding powder. However, in order to obtain a molded article having a true specific gravity of at least 2.17 and a breakdown voltage of about 10 KV/0.1 mm, a preforming pressure of more than 150 Kg/$cm^2$ was required. Other physical properties are shown in Table 1. (The fine powder obtained in the present Comparative Example corresponds to the non-fibrous fine PTFE powder described in British Pat. No. 1,076,852.)

Example 1.

The non-fibrous fine powder obtained in Comparative Example 1 was further milled by means of a "Ultrasonic Jet Mizer" PJM-280 (an air mill manufactured by Nippon Pneumatic Industry Co., Ltd.) at a power of 37 KW, a nozzle pressure of 6 Kg/$cm^2$, an air consumption of 5.4 $m^3$/min., and a treating rate of 50 Kg/hour.

The specific surface area of the resulting ultra-fine PTFE powder was 4.9 $m^2$/g and the low pressure molding coefficient thereof was 8.8. A molded article produced under a preforming pressure of 50 Kg/$cm^2$ had a true specific gravity of 2.1782 and a breakdown voltage of 9.7 KV/0.1 mm, and had excellent properties suitable for electric insulating tape. Other physical properties are shown in Table 1.

Example 2

The non-fibrous fine powder obtained in Comparative Example 1 was further ground by means of the same "Ultrasonic Jet Mizer" under the same conditions as in Example 1 except that the treating rate was 20 Kg/hour.

The specific surface area of the resulting ultra-fine powder was 5.6 $m^2$/g and the low pressure molding coefficient thereof was 8.6. When molded under a preforming pressure of 30 Kg/$cm^2$, there was obtained an excellent molded article having a true specific gravity of 2.1830 and a breakdown voltage of 10.0 KV/0.1 mm. Other physical properties are shown in Table 1.

Example 3

The spherical particles having a specific surface area of 2.5 obtained in Polymerization Example 2 were milled by means of the same "Ultrasonic Jet Mizer" under the same conditions as in Example 1 except that the treating rate was 20 Kg/hour.

The ultra-fine powder obtained had a specific surface area of 7.9 $m^2$/g and a low pressure molding coefficient of 4.0. A molded product produced under a preforming pressure of 50 Kg/$cm^2$ was an excellent product having a true specific gravity of 2.1894 and a breakdown voltage of 8.0 KV/0.1 mm. Other physical properties are shown in Table 1.

Example 4

The fine powder having a specific surface area of 2.7 and a low pressure molding coefficient of 26 corresponding to the fibrous fine powder prepared in accordance with the method described in U.S. Pat. No. 2,936,301 was milled by means of the same "Ultrasonic Jet Mizer" in the same manner as in Example 1 except that the treating rate was 20 Kg/hour.

The ultra-fine powder obtained had a specific surface area of 5.4 $m^2$/g and a low pressure molding coefficient of 8.3. A molded article produced under a preforming pressure of 50 Kg/$cm^2$ had a true specific gravity of 2.1874, a breakdown voltage of 8.2 KV/0.1 mm and a surface smoothness of 60 seconds. A molded article obtained from the starting fibrous fine powder had a rough surface, and the surface smoothness thereof was lower than 2 seconds.

It is obvious that the fibrous fine powder which offers a molded article having a rough surface such as a surface smoothness of lower than 2 seconds can be sufficiently improved by the present process.

Comparative Example 2

The polymer obtained in Polymerization Example 3 was milled by means of a "Micron Mill" (manufactured by Hosokawa Iron Works Ltd.) at a peripheral speed of 50 m/sec. The "Micron Mill" is a mill in which grinding is carried out by the rotation of a multi-bladed rotor, and particles are pulverized mainly by a shearing force.

The fine PTFE powder obtained was a fibrous fine powder having a specific surface area of 1.9. This was further milled by means of a "Ultrasonic Jet Mizer," in the same manner as in Example 1 except that a treating rate was 10 Kg per hour.

The fine PTFE powder obtained had a specific surface area of 2.16 and a low pressure molding coefficient of 65.3, which gave a molded article having a true specific gravity of 2.17 and a breakdown voltage of less than 2.0 KV/0.1 mm when molded under a preforming pressure of 300 Kg/$cm^2$.

Comparative Example 3

The polymer obtained in Polymerization Example 4 was milled by means of a "Micron Mill" in the same manner as in Comparative Example 2 to give a fibrous fine powder having a specific surface area of 1.6. The fine powder thus obtained was further ground by means of a "Ultrasonic Jet Mizer" in the same manner as in Example 1 except that a treating rate was 20 Kg/hour.

The resulting fine PTFE powder having a specific surface area of 3.7, and a low pressure molding coefficient of 146.6 provided a molded article having a true specific gravity of about 2.17 under a preforming pressure of more than 150 Kg/cm².

As shown in Comparative Examples 2 and 3, a powder having a specific surface area of not greater than 2.0 cannot be used for the present process.

higher than 15 seconds, which comprises milling a polytetrafluoroethylene molding powder having a specific surface area of 2 to 4 m²/g and a low pressure molding coefficient of from 2 to 150 mainly by the milling action effected by the interparticle collision at a temperature below 100° C in a gas stream of more than 2.5 Mach.

2. A process according to claim 1, wherein the milling is effected at a temperature below 50° C.

TABLE 1

| Example or Comparative Example number | Specific surface area (m.²/g.) | Preforming pressure (kg./cm.²) | Specific gravity of a— Preform article | Specific gravity of a— Molded product | Breakdown voltage (kv./0.1 mm.) | Tensile strength (kg./cm.²) | Elongation (percent) | Low pressure molding coefficient | Surface smoothness (sec.) |
|---|---|---|---|---|---|---|---|---|---|
| Example: | | | | | | | | | |
| 1 | 4.9 | 50 | 1.6217 | 2.1782 | 9.7 | 437 | 412 | 8.8 | 100 |
|  |  | 100 | 1.9490 | 2.1813 | 11.5 |  |  |  |  |
|  |  | 150 | 2.0572 | 2.1870 | 11.5 |  |  |  |  |
| 2 | 5.6 | 20 | 1.4990 | 2.1711 | 6.7 | 433 | 425 | 8.6 | 100 |
|  |  | 30 | 1.5956 | 2.1810 | 10.3 |  |  |  |  |
|  |  | 50 | 1.7296 | 2.1820 | 10.0 |  |  |  |  |
|  |  | 100 | 1.9303 | 2.1869 | 10.9 |  |  |  |  |
|  |  | 150 | 2.0511 | 2.1906 | 10.8 |  |  |  |  |
|  |  | 200 | 2.1198 | 2.1900 | 10.6 |  |  |  |  |
|  |  | 300 | 2.1776 | 2.1900 | 10.6 |  |  |  |  |
|  |  | 350 | 2.1887 | 2.1900 | 10.6 |  |  |  |  |
| 3 | 7.9 | 50 | 1.6549 | 2.1894 | 8.0 |  |  | 4.0 | 80 |
|  |  | 150 | 2.0139 | 2.1934 | 8.7 |  |  |  |  |
| 4 | 5.4 | 50 | 1.8045 | 2.1874 | 8.2 |  |  | 8.3 | 60 |
|  |  | 150 | 2.1095 | 2.1908 | 9.1 |  |  |  |  |
| Comparative Example: | | | | | | | | | |
| 1 | 3.6 | 50 | 1.6654 | 2.1465 | <3.0 | 457 | 400 | 26.6 | 120 |
|  |  | 100 | 1.9527 | 2.1663 | 8.4 |  |  |  |  |
|  |  | 150 | 2.0603 | 2.1731 | 8.5 |  |  |  |  |
|  |  | 300 | 2.1761 | 2.1718 | 9.9 |  |  |  |  |
| 2 | 2.2 | 50 | 1.8150 | 2.0807 | <2.0 | 262 | 275 | 65.3 |  |
|  |  | 150 | 2.0842 | 2.1460 | <2.0 |  |  |  |  |
|  |  | 300 | 2.1921 | 2.1697 | <2.0 |  |  |  |  |
| 3 | 3.7 | 50 | 1.7319 | 2.0211 | <2.0 |  |  |  | 120 |
|  |  | 100 | 1.9458 | 2.1465 | 4.3 |  |  |  |  |
|  |  | 150 | 2.0509 | 2.1677 | 6.2 |  |  |  |  |
|  |  | 300 | 2.1635 | 2.1681 | 7.2 |  |  |  |  |

What is claimed is:

1. A process for the preparation of polytetrafluoroethylene having a specific surface area of 4 to 9 m²/g, a low pressure molding coefficient of not greater than 20 and a degree of surface smoothness of 3. A polytetrafluoroethylene fine powder having a specific surface area of 4 to 9 m²/g, a low pressure molding coefficient of not greater than 20 and a degree of surface smoothness of higher than 15 seconds.

* * * * *